(12) United States Patent
Yoshioka et al.

(10) Patent No.: US 12,323,967 B2
(45) Date of Patent: Jun. 3, 2025

(54) TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Hiroki Harada, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 182 days.

(21) Appl. No.: 17/629,590

(22) PCT Filed: Jul. 29, 2019

(86) PCT No.: PCT/JP2019/029684
§ 371 (c)(1),
(2) Date: Jan. 24, 2022

(87) PCT Pub. No.: WO2021/019650
PCT Pub. Date: Feb. 4, 2021

(65) Prior Publication Data
US 2022/0279543 A1 Sep. 1, 2022

(51) Int. Cl.
*H04W 72/1263* (2023.01)
*H04L 27/26* (2006.01)
(Continued)

(52) U.S. Cl.
CPC ... *H04W 72/1263* (2013.01); *H04L 27/26025* (2021.01); *H04W 72/0446* (2013.01); *H04W 72/0453* (2013.01); *H04W 72/20* (2023.01)

(58) Field of Classification Search
CPC ............. H04W 72/1263; H04W 72/20; H04W 72/0446; H04W 72/0453; H04L 27/26025
See application file for complete search history.

(56) References Cited

U.S. PATENT DOCUMENTS 11,601,253 B2 * 3/2023 Reddy ............... H04L 27/26025
2018/0220441 A1 * 8/2018 Akula ............... H04W 72/1268
(Continued)

FOREIGN PATENT DOCUMENTS

EP          3986050 A1 * 4/2022 ........... H04L 5/0016
JP       2019031907 A * 2/2019
(Continued)

OTHER PUBLICATIONS

International Search Report issued in PCT/JP2019/029684 on Jan. 21, 2020 (1 page).
(Continued)

*Primary Examiner* — Shean Tokuta
(74) *Attorney, Agent, or Firm* — Osha Bergman Watanabe & Burton LLP

(57) ABSTRACT

A terminal according to an aspect of the present disclosure includes a control section that assumes a certain restriction being applied to a communication supporting a subcarrier spacing wider than a certain subcarrier spacing, and a transmitting/receiving section that performs transmission/reception processing of the communication based on the certain restriction. According to an aspect of the present disclosure, it is possible to suitably suppress adverse influence of a time taken for communication switching even when a relatively wide subcarrier spacing is used.

6 Claims, 18 Drawing Sheets

(51) Int. Cl.
*H04W 72/0446* (2023.01)
*H04W 72/0453* (2023.01)
*H04W 72/20* (2023.01)

(56) References Cited

U.S. PATENT DOCUMENTS

| | | | |
|---|---|---|---|
| 2019/0007910 A1* | 1/2019 | Akula | H04W 52/365 |
| 2019/0052483 A1* | 2/2019 | Akula | H04L 5/0053 |
| 2019/0132110 A1* | 5/2019 | Zhou | H04W 72/0453 |
| 2019/0132845 A1* | 5/2019 | Babaei | H04L 1/1812 |
| 2019/0150174 A1* | 5/2019 | Kim | H04W 72/23 |
| | | | 370/330 |
| 2019/0246416 A1* | 8/2019 | Park | H04W 72/21 |
| 2019/0280784 A1* | 9/2019 | Kwak | H04W 72/046 |
| 2019/0363824 A1* | 11/2019 | Sun | H04W 76/27 |
| 2020/0068504 A1 | 2/2020 | Yi et al. | |
| 2020/0169375 A1* | 5/2020 | Yi | H04L 5/0064 |
| 2020/0213067 A1* | 7/2020 | Cirik | H04L 5/0051 |
| 2020/0221485 A1* | 7/2020 | Cirik | H04L 25/0224 |
| 2020/0314885 A1* | 10/2020 | Cirik | H04L 5/0048 |
| 2021/0021330 A1* | 1/2021 | Khoshnevisan | H04L 27/2602 |
| 2021/0153250 A1* | 5/2021 | Jiang | H04L 1/00 |
| 2021/0160036 A1* | 5/2021 | Reddy | H04B 7/2656 |
| 2022/0046559 A1* | 2/2022 | Wu | H04W 52/50 |
| 2022/0225362 A1* | 7/2022 | Yi | H04L 1/1864 |
| 2022/0239442 A1* | 7/2022 | Yoshioka | H04W 28/18 |
| 2022/0264659 A1* | 8/2022 | Enbuske | H04W 74/002 |
| 2022/0279543 A1* | 9/2022 | Yoshioka | H04L 27/26025 |
| 2023/0147423 A1* | 5/2023 | Bai | H04W 16/28 |
| | | | 370/329 |

FOREIGN PATENT DOCUMENTS

| | | | | |
|---|---|---|---|---|
| WO | 2018199691 A1 | 11/2018 | | |
| WO | WO-2019031907 A1 * | 2/2019 | | H04L 1/00 |
| WO | WO-2019084570 A1 * | 5/2019 | | H04B 17/318 |
| WO | WO-2020087463 A1 * | 5/2020 | | H04L 5/0058 |
| WO | WO-2020250322 A1 * | 12/2020 | | H04L 5/0053 |
| WO | WO-2020250323 A1 * | 12/2020 | | H04L 5/0051 |
| WO | WO-2021019650 A1 * | 2/2021 | | H04L 27/26025 |
| WO | WO-2022069160 A1 * | 4/2022 | | H04W 16/14 |

OTHER PUBLICATIONS

Written Opinion of the International Searching Authority issued in PCT/JP2019/029684 on Jan. 21, 2020 (3 pages).

Ericsson; "ON/OFF mask usecases for NR UE transmissions"; 3GPP TSG-RAN WG4 Meeting NR#3, R4-1709846; Nagoya, Japan; Sep. 18-21, 2017 (8 pages).

Ericsson; "UE transient period for NR"; 3GPP TSG-RAN WG4 #82bis, R4-1703850; Spokane, Washington, USA; Apr. 3-7, 2017 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Chinese Application No. 201980100908.0, dated Jun. 28, 2024 (12 pages).

Office Action issued in Chinese Application No. 201980100908.0; Dated Nov. 28, 2024 (12 pages).

* cited by examiner

| μ | NR Slot length (ms) | BWP switch delay $T_{BWPswitchDelay}$ (slots) | |
|---|---|---|---|
| | | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

FIG. 4

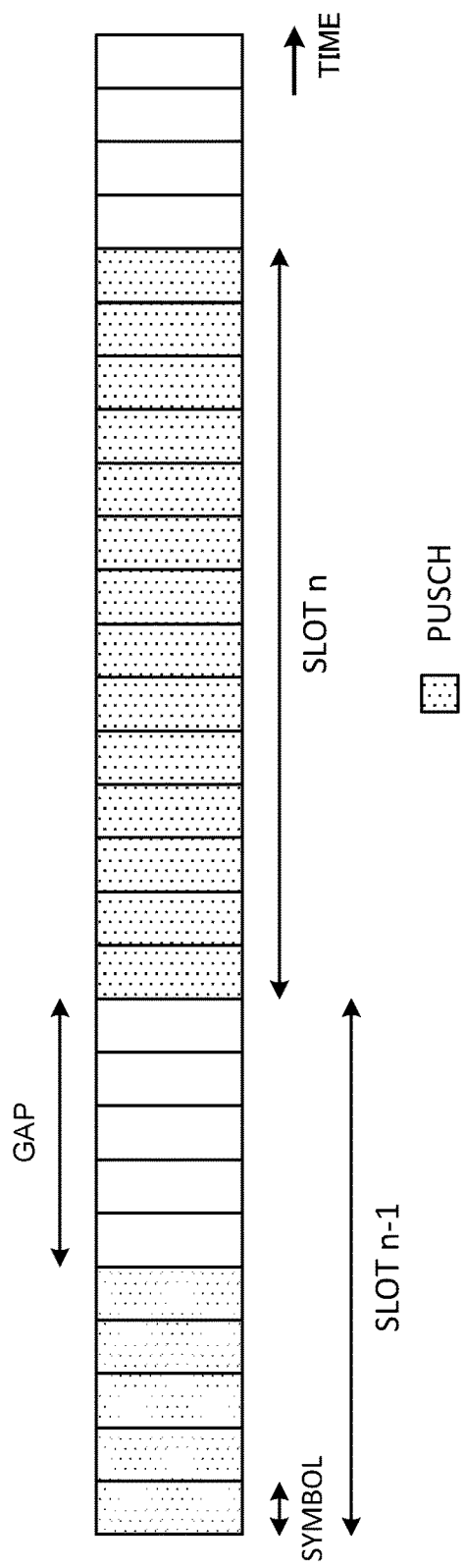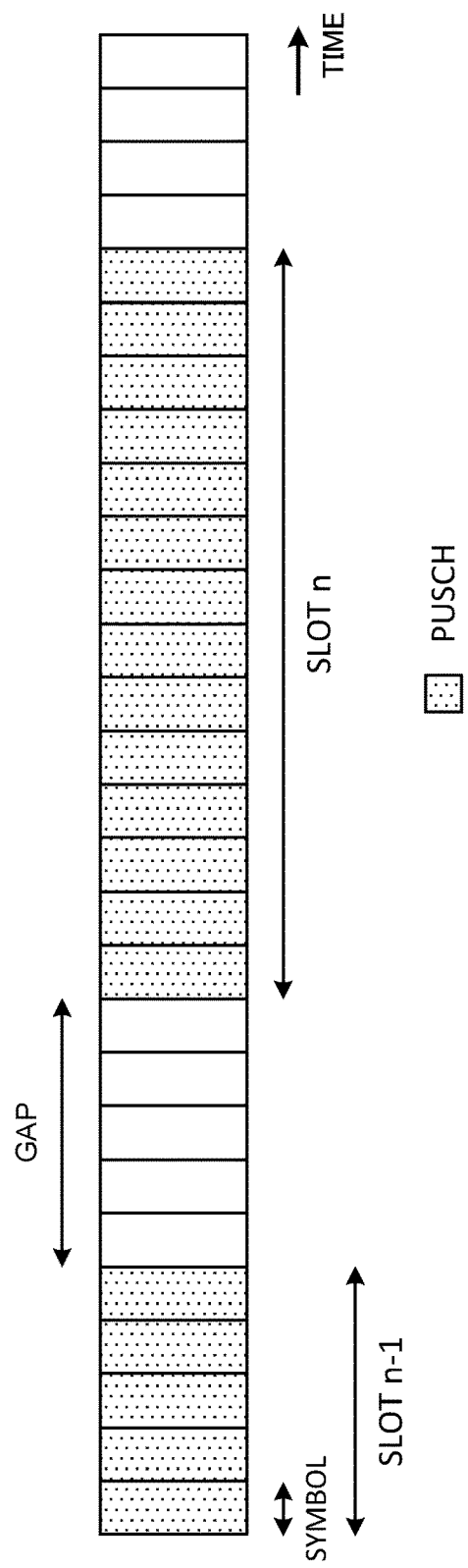

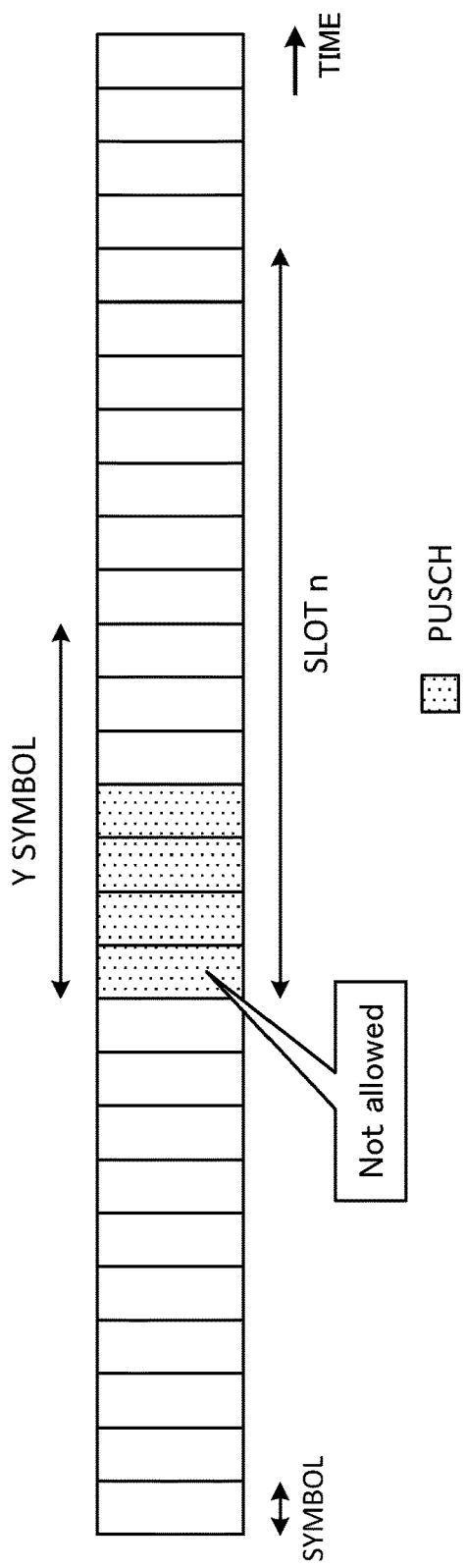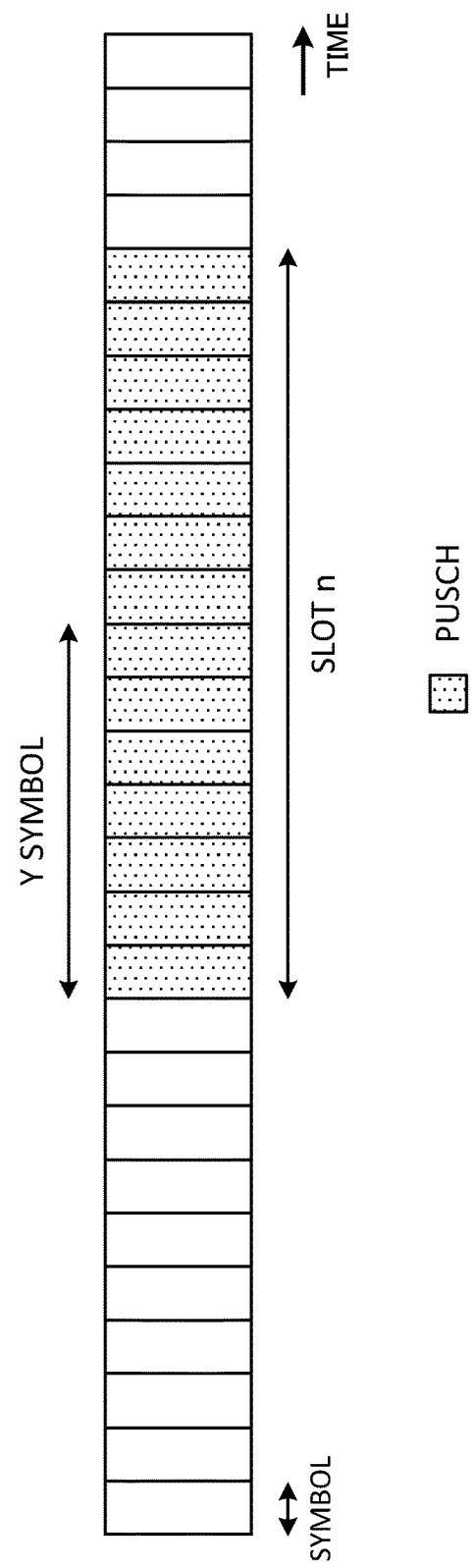

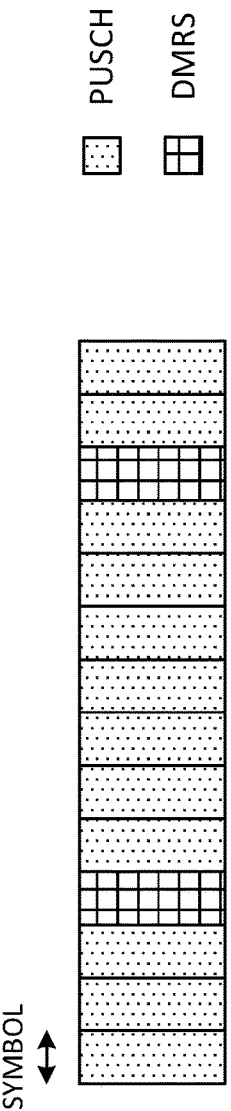
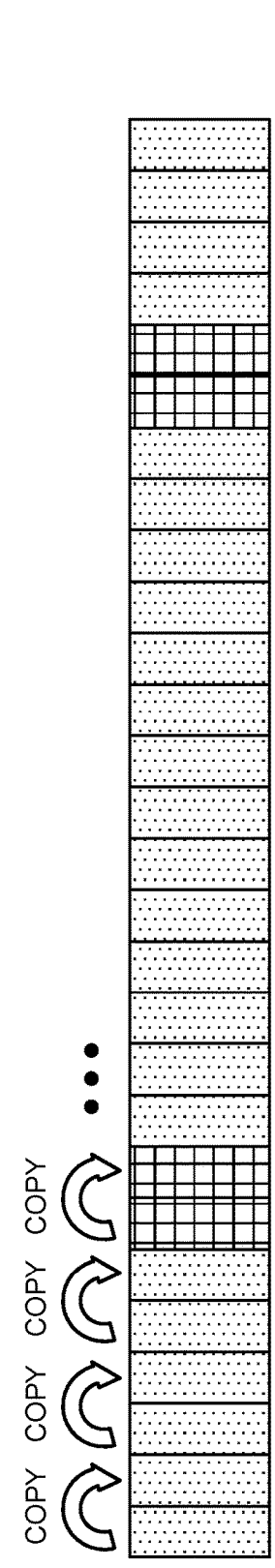
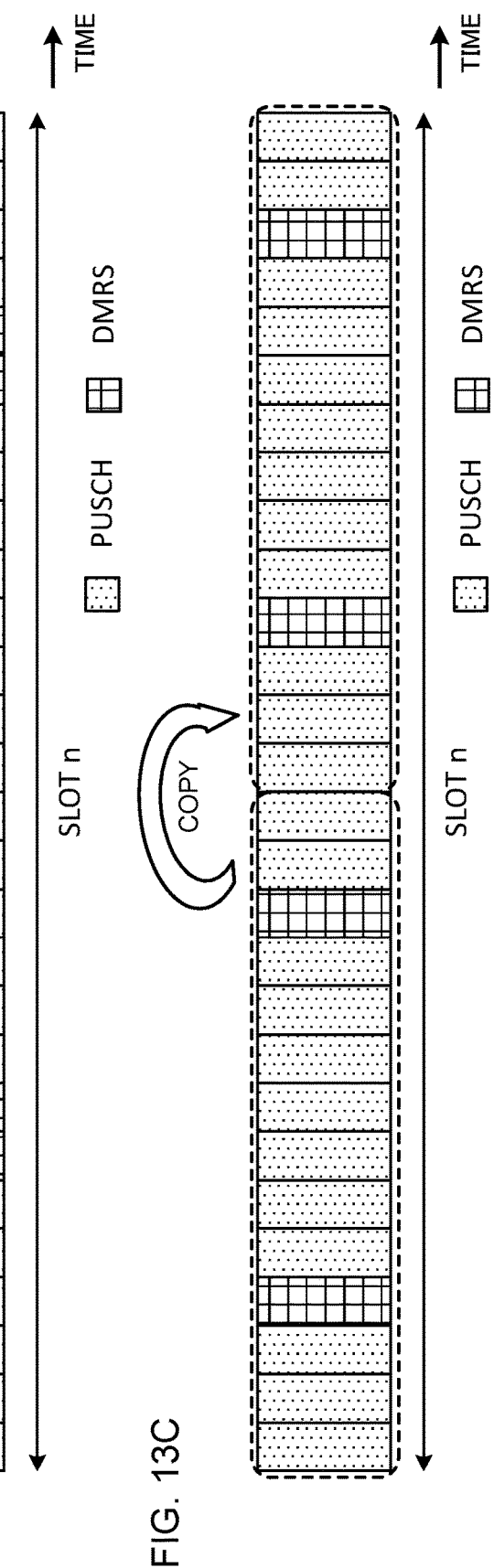
FIG. 13A
FIG. 13B
FIG. 13C

| $\mu$ | NR Slot length (ms) | BWP switch delay $T_{BWPswitchDelay}$ (slots) | |
|---|---|---|---|
| | | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |
| 4 | 0.0625 | 12 | 36 |
| 5 | 0.03125 | 24 | 72 |
| 6 | 0.015625 | 48 | 144 |

FIG. 14

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Study have been made on the use of a frequency range (FR) (may be called, for example, FR4) above a certain frequency (for example, 52.6 GHz) in future radio communication systems (for example, an NR of Rel. 16 or later).

A transient period is one of time periods taken for communication switching. For example, the transient period may mean a period in which the output power (or transmission power) of a transmitter shifts from a power level to another power level. For example, the transient period may be defined as a period in which the output power shifts from an off power level to an on power level or vice versa.

However, not much progress has been made in discussions of the transient period with taken into account a relatively wide subcarrier spacing (SCS) (for example, an SCS larger than 120 kHz), which is used in FR4. Similarly to the case of the transient period, not much progress has been made in discussions of Bandwidth Part (BWP) switching delay, beam switching delay, and the like. Without clear definition thereof, communication quality potentially degrades in a high frequency band such as FR4, which may suppress communication throughput increase.

Thus, it is an object of the present disclosure to provide a terminal and a radio communication method that are capable of suitably suppressing adverse influence of a time taken for communication switching even when a relatively wide subcarrier spacing is used.

Solution to Problem

A terminal according to an aspect of the present disclosure includes: a control section configured to assume that a certain restriction is applied to a communication corresponding to a subcarrier spacing wider than a certain subcarrier spacing; and a transmitting/receiving section configured to perform transmission/reception processing of the communication based on the certain restriction.

Advantageous Effects of Invention

According to an aspect of the present disclosure, it is possible to suitably suppress adverse influence of a time taken for communication switching even when a relatively wide subcarrier spacing is used.

BRIEF DESCRIPTION OF DRAWINGS

FIG. 4 is a diagram to show definition of BWP switching delay of Rel. 15 NR;

FIGS. 5A and 5B are diagrams to show an example of a gap according to a first embodiment;

FIGS. 6A and 6B are diagrams to show an example of a scheduling restriction according to a second embodiment;

FIGS. 13A to 13C are diagrams to show an example of symbol copy according to a third embodiment;

FIG. 14 is a diagram to show an example of definition of BWP switching delay that can support an SCS wider than 120 kHz;

DESCRIPTION OF EMBODIMENTS (FR)

For NR, the use of a frequency band up to 52.6 GHz has been studied. For NR of Rel. 16 or later, the use of a frequency band above 52.6 GHz has been studied. Note that a frequency band may be interpreted as a frequency range (FR) as appropriate.

Figure 1:
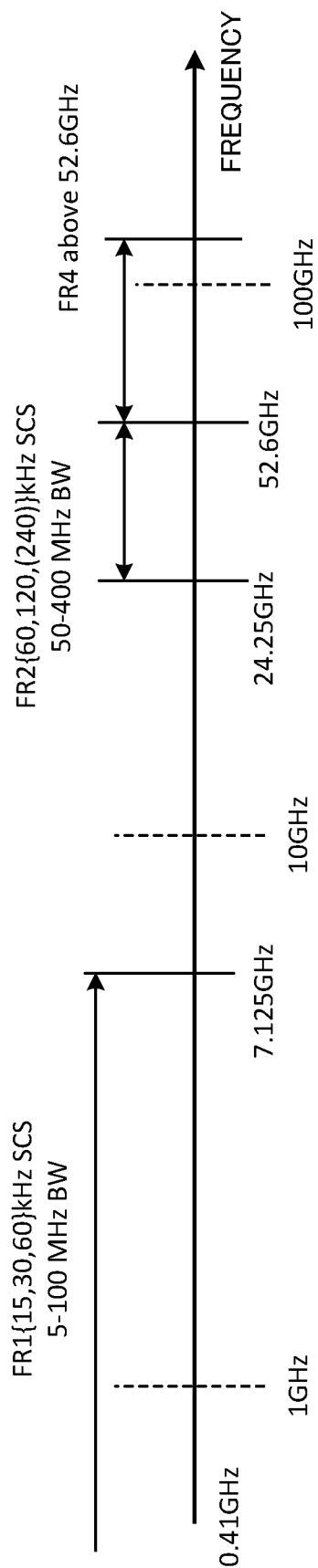
FIG. 1 is a diagram to show an example of FRs.

The frequency band above 52.6 GHz may be called FR4. FIG. 1 is a diagram to show an example of FRs. As shown in FIG. 1, FR4 is, for example, 52.6 GHz to 114.25 GHz. Note that, among frequency ranges in the existing Rel. 15 NR, FR1 corresponds to 410 MHz to 7.152 GHz, and FR2 corresponds to 24.25 GHz to 52.6 GHz. FR4 may be called FRx (x is an arbitrary string).

It is assumed that, in FR4, phase noise is large and a propagation loss is large. Highly sensitive problems are assumed for a peak-to-average power ratio (Peak-to-Average Power Ratio, PAPR) and power amplifier (PA) non-linearity.

With the above-described matter taken into consideration, it is conceivable that CP-OFDM, DFT-S-OFDM, and the like in which a subcarrier spacing (SCS) larger than in Rel. 15 NR is applied are used in FR4 (or FR4 waveform). For example, it has been studied that an SCS (for example, 240 kHz, 480 kHz, or 960 kHz) wider than 15 kHz to 120 kHz defined by Rel. 15 NR is used in FR4.

Although a DL channel (for example, a PDCCH) is designed based on an OFDM waveform in Rel. 15, it is assumed that a channel design based on a single carrier is to be studied for the frequency band above 52.6 GHz.

(Transient Period)

A transient period is one of time periods taken for communication switching. For example, the transient period may mean a period in which output power (or transmission power) of a transmitter shifts from a power level to another power level. For example, the transient period may be defined as a period in which the output power shifts from an off power level to an on power level or vice versa.

Figure 2:
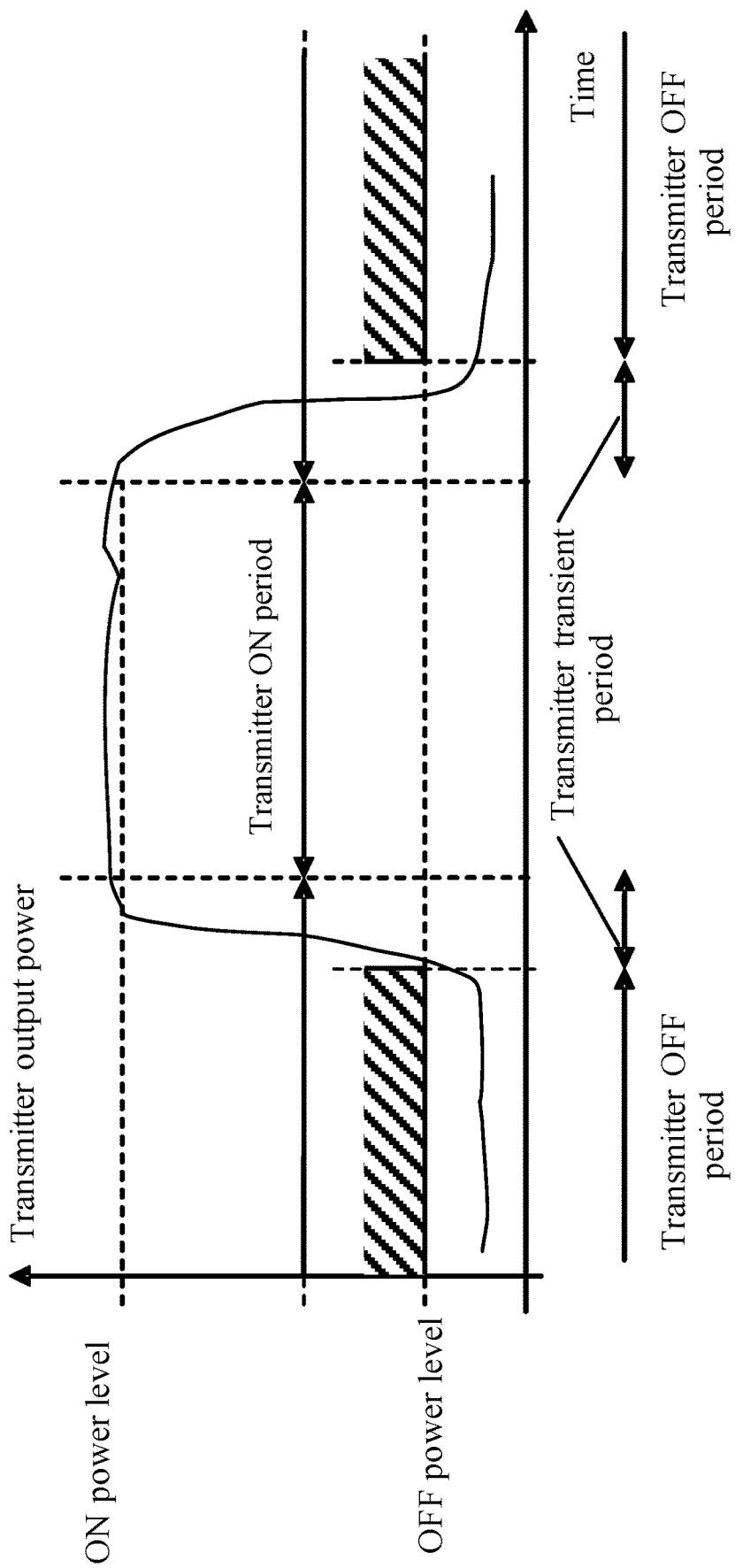
FIG. 2 is a diagram to show an example of a transient period.

FIG. 2 is a diagram to show an example of the transient period. In the present example, the horizontal axis represents time, and the vertical axis represents the output power of the transmitter. A transmitter off period corresponds to a period in which the power of the transmitter is at the off power level, and a transmitter on period corresponds to a period in which the power of the transmitter is at the on power level (may be called a request level or the like). A period in which transition is made from the off power level to the on power level or vice versa is indicated as the transient period of the transmitter.

An actual Radio Frequency (RF) device cannot avoid the transient period because of factors as described below:
Electric power on/off,
Electric power variation (for example, in-band uplink carrier aggregation (CA)/dual connectivity (DC) when one power amplifier is used, and 1CC transmission drop due to reception of UL cancellation notification during PUSCH transmission with two component carriers (CCs) having different start or end timing or during simultaneous transmission with a plurality of CCs),
Frequency domain resource change (for example, frequency hopping), and
Beam switching.

In Rel. 15 NR, the transient period at a gNB is 10 μs for FR1 and 3 μs for FR2 (note that only power on/off is considered). In Rel. 15 NR, the transient period at a UE is 10 μs for FR1 and 5 μs for FR2 (due to an arbitrary factor described above).

However, it is assumed that influence of the transient period increases when the symbol length decreases in the future. Specifically, it is conceivable that the transient period extends across an extremely large number of symbols.

Figure 3:
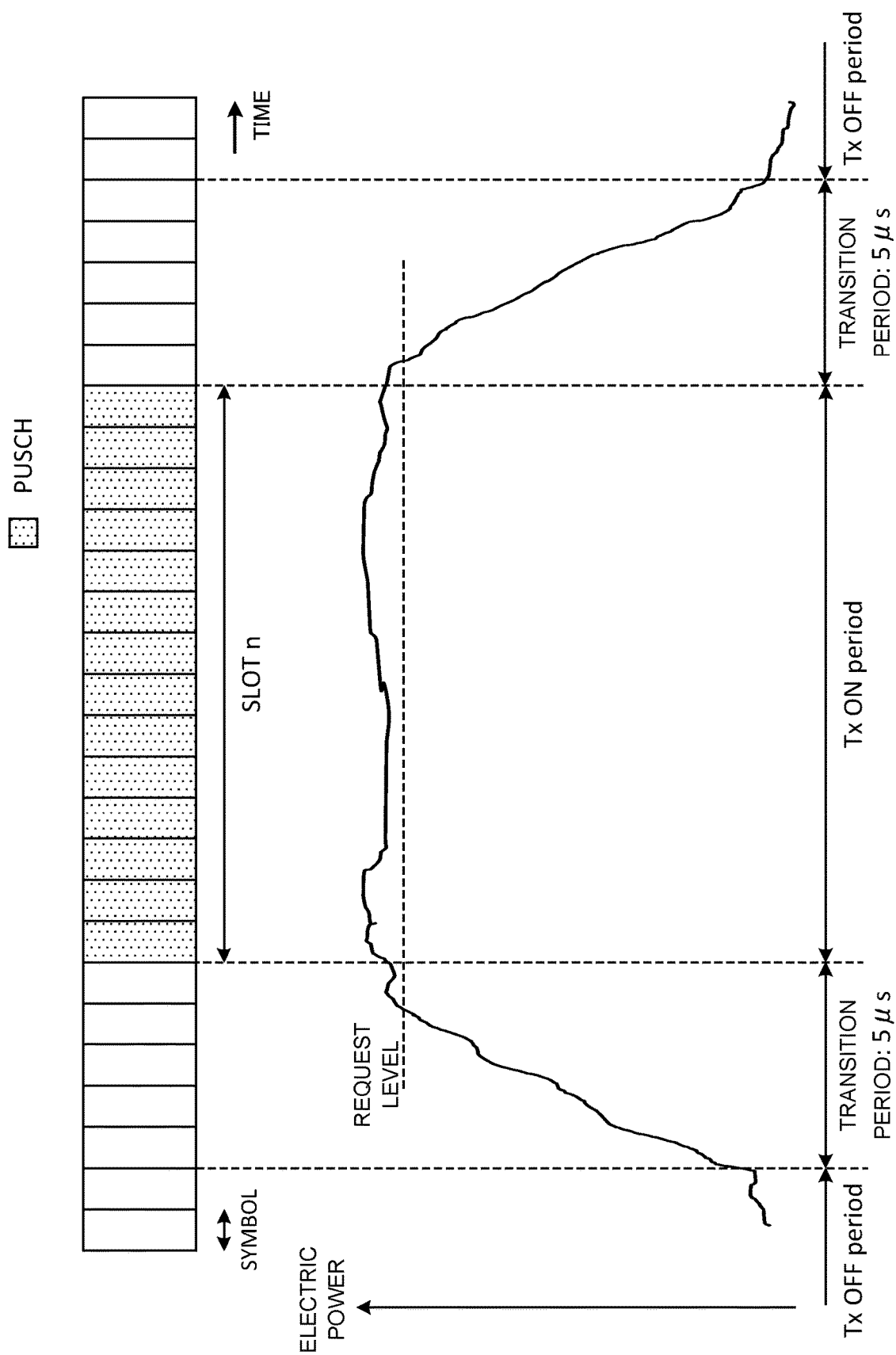
FIG. 3 is a diagram to show an example of influence of the transient period when a symbol length is extremely short.

FIG. 3 is a diagram to show an example of influence of the transient period when the symbol length is extremely short. In the present example, the SCS=960 KHz is assumed. In this case, one symbol corresponds to 1 μs approximately.

FIG. 3 shows the transient period before and after PUSCH transmission. In FIG. 3, the transient period is assumed to be 5 μs, which is the transient period of a UE in FR2 in Rel. 15 NR. In this case, the transient period extends across five symbols.

When most of available symbols in a physical channel are in the transient period (for example, the transient period of a physical channel is defined to be in X μs from the start symbol of the channel), the transmission power decreases, which leads to unstable communication or coverage decrease.

When most of available symbols in a physical channel are out of the transient period (for example, the transient period of a physical channel is defined to extend from X μs before the start symbol of the channel to the start symbol), interference increases due to collision with a signal of another physical channel or the freedom of scheduling decreases to avoid the collision.

Introduction of an expensive RF device can decrease the length of the transient period but, from a viewpoint of cost, it is not realistic to achieve a short transition time at all devices.

It is preferable to consider not only the transient period but also, for example, Bandwidth Part (BWP) switching delay and beam switching delay in FR4. The BWP switching delay may mean a delay (time) necessary from a UE/base station to switch communication from a BWP to another BWP. The beam switching delay may mean a delay (time) necessary for a UE/base station to switch communication from a beam to another beam.

In Rel. 15 NR, the BWP switching delay is defined. FIG. 4 is a diagram to show definition of the BWP switching delay in Rel. 15 NR. In the definition, μ=0, 1, 2, and 3 correspond to the SCS=15, 30, 60, and 120 kHz, respectively. Since one slot corresponds to 14 symbols, μ=0, 1, 2, and 3 corresponds to the slot length=1 ms, 0.5 ms, 0.25 ms, and 0.125 ms, respectively.

The value $T_{BWPswitchDelay}$ of the BWP switching delay may differ with UE capability, whether Type 1 or Type 2 shown is to be referred may be determined based on UE capability.

As shown in FIG. 4, a request of the BWP switching delay non-linearly depends on the SCS. Note that, when BWP switching involves change of the SCS, delay of the BWP switching may be determined based on at least one (for example, the larger one) of the SCS before the BWP switching and the SCS after the BWP switching.

The BWP switching delay in Rel. 15 NR is not defined for an SCS wider than 120 kHz, which is used in FR4. The beam switching delay (in other words, a gap for beam switching) is not defined in Rel. 15 NR.

As described above, not much progress has been made in study of a switching time (the transient period, the BWP switching delay, the beam switching delay, or the like) of at least one of a channel and a signal (may be expressed as "channel/signal"; similarly in the present disclosure, "A/B" may be interpreted as "at least one of A and B") with taken into account a relatively wide SCS (for example, an SCS larger than 120 kHz), which is used in FR4. Without clear definition thereof, communication quality potentially degrades in a high frequency band such as FR4, which may suppress communication throughput increase.

Thus, the inventors of the present invention came up with a control method for suppressing adverse influence of a time taken for communication switching even when a relatively wide SCS is used.

Embodiments according to the present disclosure will be described in detail with reference to the drawings as follows.

Radio communication methods according to the respective embodiments may be each employed alone or in combination of at least two.

Note that each embodiment may be applied to above-described FR4 (for example, a certain frequency range above 52.6 GHz) or may be applied to another FR (for example, FR1 or FR2). FRx (x is an arbitrary alphanumeric character) in the present disclosure may be interpreted as an arbitrary FRx.

A channel/signal in each embodiment may mean a channel/signal of a relatively wide SCS (for example, an SCS larger than 120 kHz) or may mean a channel/signal of an SCS (for example, an SCS equal to or lower than 120 kHz) used in the existing Rel. 15 NR. The relatively wide SCS may be interpreted as a case in which the length of a time unit (for example, a slot or a symbol) is short.

In the following description, the transient period may be interchangeably interpreted with BWP switch delay (BWP switching delay), beam switch delay (beam switching delay), or the like. In the present disclosure, transmission power, BWP, and beam may be interchangeably interpreted.

Radio Communication Method

First Embodiment

A UE may be configured with or notified of a gap for the transient period by using higher layer signaling, physical layer signaling, or a combination of these. The UE may assume that, in the gap, an arbitrary channel/signal is not allocated, not scheduled, not configured, or not transmitted or the transmission power of a particular channel/signal is in transition.

Note that in the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit y(PDU), or the like. The broadcast information may be, for example, a master information block (MIB), a system information block (SIB), minimum system information (Remaining Minimum System Information (RMSI)), other system information (OSI), or the like.

The gap may correspond to any of (1) to (5) below or a combination thereof:

(1) Gap between two slots;
(2) Gap between two subslots;
(3) Gap between two slot sets;
(4) Gap between DL and UL; and
(5) Gap between two channels/signals.

The gap between two slots in (1) described above may be inserted between the slots or may be inserted so that the gap is included in a slot (as part of the slot). For (2) to (5) described above, as well, it may be assumed that a gap is inserted at a position where the term "slot" is replaced with subslot, slot set, DL and UL, and channel/signal.

As for (4) described above, it may be assumed that the gap between a DL slot/channel/signal and a UL slot/channel/signal is larger than the gap between a DL slot/channel/signal and another DL slot/channel/signal or is larger than the gap between a UL slot/channel/signal and another UL slot/channel/signal.

A length X of each above-described gap may be predetermined in specifications or may be configured to the UE by higher layer signaling, physical layer signaling, or a combination of these.

FIGS. 5A and 5B are diagrams to show an example of a gap according to a first embodiment. In the present example, the length of the gap is five symbols, but the present disclosure is not limited thereto. FIG. 5A shows an example in which a gap is included in slot n−1, and FIG. 5B shows an example in which a gap is included between slot n−1 and slot n.

Note that the UE that uses carrier aggregation or dual connectivity of different numerologies (for example, different SCSs) may assume that above-described gaps are aligned among a plurality of CCs (or cells) (in other words, there are above-described gaps at the same timings), may assume that the gaps are not aligned, may assume that the gaps do not necessarily need to be aligned, may assume that the gaps are same, may assume that the gaps are different from each other, or may assume that the gaps can be different from each other.

Alignment of gaps among a plurality of CCs may mean matching of one or both of the start and end timings of the gaps among the plurality of CCs.

For example, it may be assumed that above-described gaps are aligned (are not aligned, do not necessarily need to be aligned, are same, are different, or can be different) in one cell group, one PUCCH group, or one frequency range.

It may be assumed that above-described gaps are aligned (are not aligned, do not necessarily need to be aligned, are same, are different, or can be different) in a plurality of cell groups, a plurality of PUCCH groups, or a plurality of frequency ranges.

According to the first embodiment described above, it is possible to suitably suppress adverse influence due to channel/signal switching by, for example, configuring that the transient period is completed in a gap.

Second Embodiment

The UE may assume that there is a certain restriction (may be called, for example, a scheduling restriction) related to the transient period.

The UE may assume that at least one of scheduling restrictions described below is applied based on UE capability. For example, when the UE has or reports UE capability indicating that at least one of the scheduling restrictions described below is supported, the UE may perform transmission/reception processing on the assumption of the scheduling restriction.

Hereinafter, a "symbol" may be interpreted as an arbitrary time unit such as a slot or a subslot.

[Restriction of Short Channel/Signal]

The UE may assume that a particular channel/signal or all channels/signals are not smaller (not shorter) than a certain number (for example, Y) of symbols. It may be defined that a particular channel/signal or all channels/signals are not smaller (not shorter) than Y symbols. In other words, the UE may assume that a scheduled particular channel/signal has a time resource equal to or more than Y symbols. When the length of a channel/signal is equal to or longer than a certain length, influence of the transition time can be suitably suppressed.

For example, the UE may assume that at least one of slot-based allocation and subslot-based allocation is allowed for a particular channel/signal or all channels/signals.

The value of the above-described Y may be configured (may be interpreted as, for example, notified or indicated) to the UE by higher layer signaling, physical layer signaling, or a combination of these. Note that the value of Y may be independently configured for each channel/signal or may be configured in common to some channels/signals.

FIGS. 6A and 6B are diagrams to show an example of a scheduling restriction according to a second embodiment. In the present example, the value of above-described Y is seven symbols, but the present disclosure is not limited thereto. FIG. 6A shows a PUSCH of four symbols, which is shorter than Y, but the UE does not necessarily need to expect that such a PUSCH shorter than Y is scheduled. FIG. 6B shows a PUSCH of 14 symbols, which is longer than Y, but the UE may assume that a PUSCH having such a length equal to or longer than Y is scheduled.

[Restriction of Electric Power of Temporally Close Channels/Signals]

The UE may restrict electric power of a plurality of temporally close channels/signals. In the present disclosure, "temporally close" may mean that a plurality of channels/signals are continuous or overlap in time domain, or may mean that a plurality of channels/signals are transmitted at gaps not larger than a certain number (for example, Z) of symbols.

For example, the UE may apply the same transmission power to a plurality of temporally close channels/signals. The UE may apply, to one or both of the plurality of channels/signals, the transmission power value of the other of the plurality of channels/signals or a certain transmission power value, while ignoring a transmission power value derived through normal transmission power control.

The UE may determine the transmission power applied to the plurality of channels/signals based on at least one of conditions below:
- The kinds of the plurality of channels/signals (for example, when the plurality of channels/signals are a PUCCH and a PUSCH, the transmission power of the PUCCH is also applied to the PUSCH, or the transmission power of the PUSCH is also applied to the PUCCH);
- Scheduled timings of the plurality of channels/signals (for example, a timing at which control information (such as DCI) for scheduling each of the plurality of channels/signals is received) (for example, the transmission power of a channel/signal scheduled earlier is applied to a channel/signal scheduled later, or the transmission power of a channel/signal scheduled later is applied to a channel/signal scheduled earlier); and
- Transmission timings of the plurality of channels/signals (for example, the transmission power of a channel/signal transmitted earlier is applied to a channel/signal transmitted later, or the transmission power of a channel/signal transmitted later is applied to a channel/signal transmitted earlier).

Note that same transmission power does not necessarily need to be completely same but only needs to have a transmission power value within a certain range.

With such a configuration, it is possible to reduce occurrence of the transition time or shorten the transition time, thereby suitably suppressing influence of the transition time.

The value of above-described Z may be configured (may be interpreted as, for example, notified or indicated) to the UE by higher layer signaling, physical layer signaling, or a combination of these. Note that the value of Z may be independently configured for each channel/signal or may be configured in common to some channels/signals. The value of Z may be determined based on a combination of the above-described plurality of channels/signals.

The above-described electric power restriction may be applied when the length of at least one of the above-described plurality of channels/signals is less than a certain value.

Figure 7:
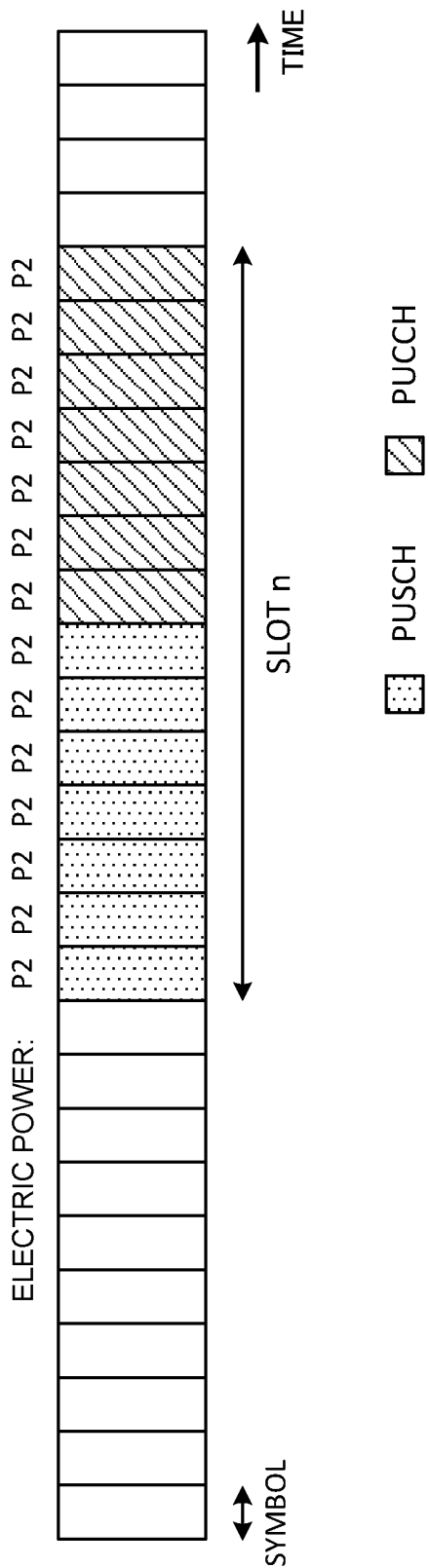
FIG. 7 is a diagram to show an example of a scheduling restriction according to the second embodiment.

FIG. 7 is a diagram to show an example of a scheduling restriction according to the second embodiment. In the present example, a PUSCH of seven symbols and a PUCCH of seven symbols are temporally continuously scheduled. In this case, the UE may apply the same transmission power value P2 to these two channels. The value P2 may be, for example, a transmission power value determined based on transmission power control of a PUSCH transmitted earlier.

[Restriction of CC Simultaneous Transmissions]

When configured to perform communication by using a plurality of cells (or CCs) (in other words, operate in at least one of carrier aggregation and dual connectivity), the UE may assume that there is at least one of scheduling restrictions below:
- Simultaneous transmissions of more than one CCs are not allowed;
- Simultaneous transmissions of more than one CCs are allowed when the transmissions of the more than one CCs are temporally aligned;
- Simultaneous transmissions of more than one CCs are allowed when the total transmission power of the more than one CCs is maintained; and
- Simultaneous transmissions of more than one CCs are allowed when transmission power difference among symbols of the more than one CCs is not larger than a certain value (for example, P3).

With such a configuration, it is possible to suitably suppress influence of the transition time.

Note that, when a channel/signal of a relatively wide SCS (for example, an SCS larger than 120 kHz) is used in at least one CC among the more than one CCs, the UE may assume that at least one of the above-described scheduling restrictions is applied.

The value of above-described P3 may be configured (may be interpreted as, for example, notified or indicated) to the UE by higher layer signaling, physical layer signaling, or combination thereof. Note that the value of P3 may be independently configured for each channel/signal.

Temporal alignment of transmissions of more than one CCs may mean matching of one or both of the transmission start and end timings of transmissions of the more than one CCs.

Figure 8:
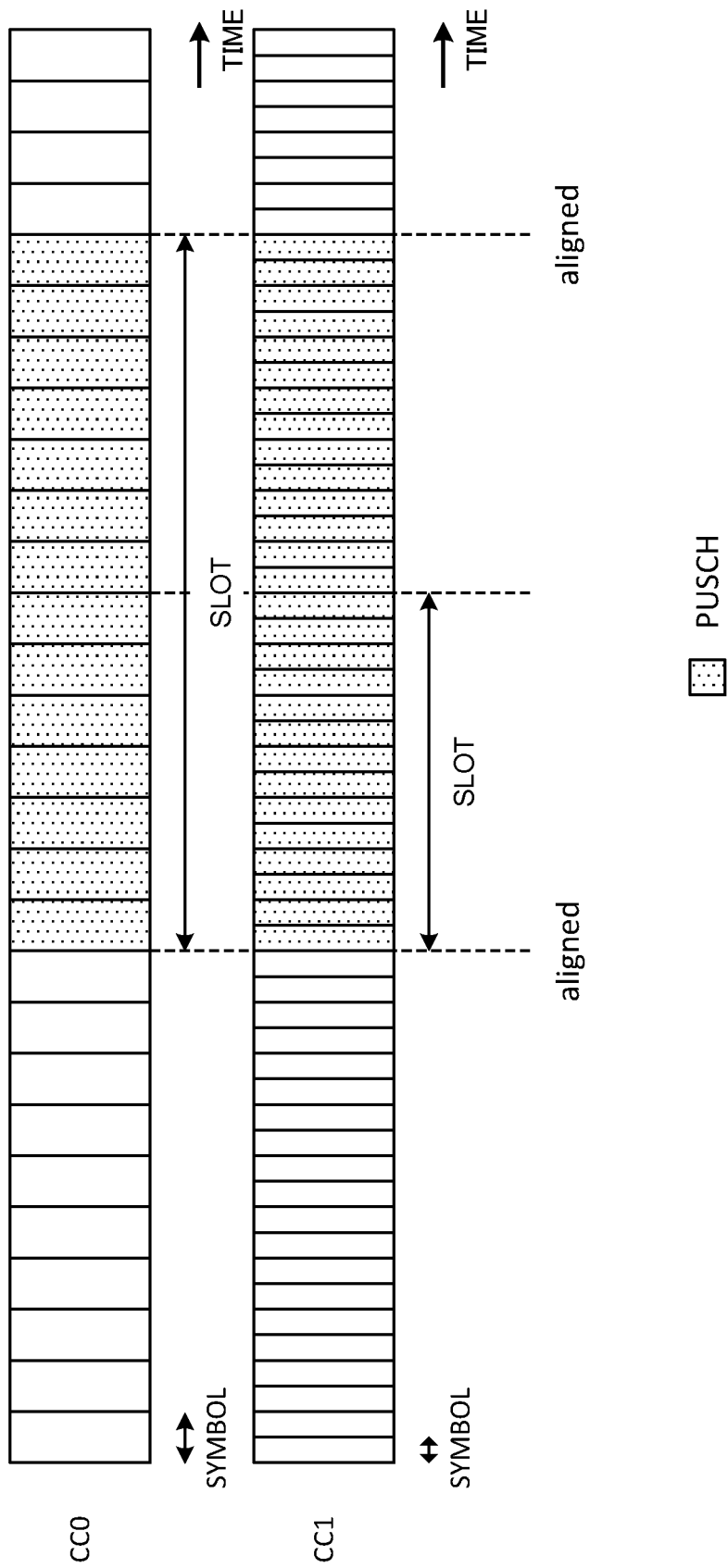
FIG. 8 is a diagram to show an example of a scheduling restriction according to the second embodiment.

FIG. 8 is a diagram to show an example of a scheduling restriction according to the second embodiment. In the present example, more than one CCs (CC0 and CC1) are temporally aligned.

In FIG. 8, the subcarrier spacing of CC1 is an integral multiple (double in the figure) of the subcarrier spacing of CC0, and slot boundaries are matched between the CCs. The transmission start and end timings are each aligned (matched) between a PUSCH of CC0 and a PUSCH of CC1 that are shown. In this case, the UE may perform simultaneous transmissions of the shown PUSCHs of CC0 and CC1.

[Restriction of Channels/Signals of Separated Frequency Domain Resources]

The UE does not necessarily need to allow a plurality of temporally close channels/signals to be transmitted with frequency resources separated from each other by a certain amount or more. The expression "temporally close" may have the above-described meaning, and duplicate description thereof is not repeated.

For example, the UE may assume that a plurality of temporally close channels/signals are allocated to the same frequency resource, or may assume that the plurality of channels/signals are allocated at gaps not larger than a certain number (for example, V) of physical resource blocks (PRBs). With such a configuration, it is possible to reduce occurrence of the transition time, thereby suitably suppressing influence of the transition time.

The value of above-described V may be configured (may be interpreted as, for example, notified or indicated) to the UE by higher layer signaling, physical layer signaling, or a combination of these. Note that the value of V may be independently configured for each channel/signal or may be configured in common to some channels/signals. The value of V may be determined based on a combination of the above-described plurality of channels/signals.

Note that a PRB in the present disclosure may be interpreted as an arbitrary frequency resource unit such as a subcarrier.

Figure 9:
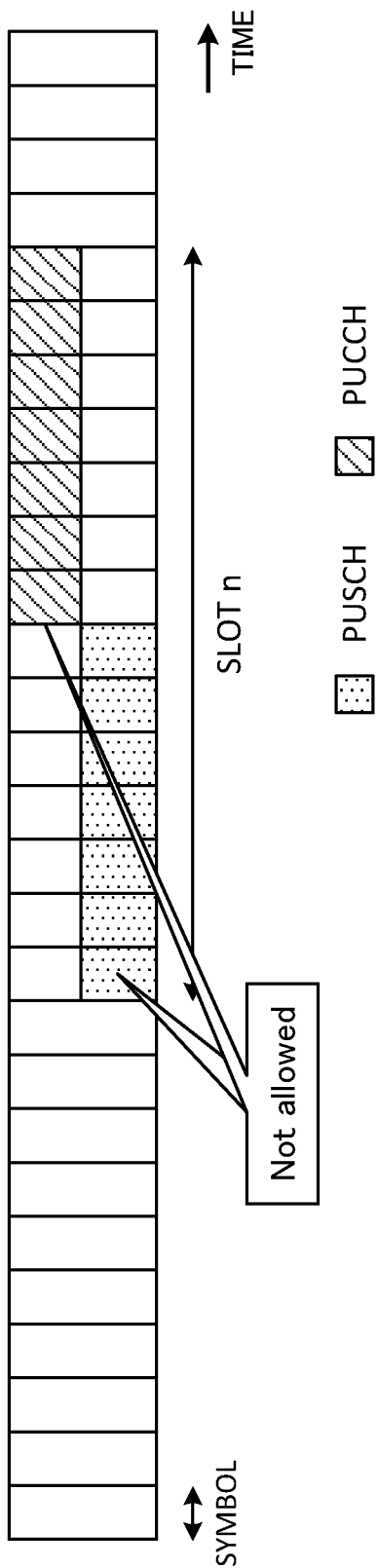
FIG. 9 is a diagram to show an example of a scheduling restriction according to the second embodiment.

FIG. 9 is a diagram to show an example of a scheduling restriction according to the second embodiment. In the present example, a PUSCH of seven symbols and a PUCCH of seven symbols are temporally continuously scheduled. However, the PUSCH and the PUCCH do not correspond to the same frequency resource. In this case, the UE does not necessarily need to expect that the PUSCH and the PUCCH are both scheduled.

[Restriction of Frequency Hopping]

The UE may assume that a restriction is applied to frequency hopping. For example, the UE does not necessarily need to support one or both of intra-slot frequency hopping and inter-slot frequency hopping for a particular channel/signal or all channels/signals. In the present disclosure, "not support" may be interpreted as "not perform".

When the length (for example, transmission symbol) of a channel/signal is larger than a certain number (for example, W) of symbols, the UE may support one or both of intra-slot frequency hopping and inter-slot frequency hopping for the channel/signal.

The value of above-described W may be configured (may be interpreted as, for example, notified or indicated) to the UE by higher layer signaling, physical layer signaling, or a combination of these. Note that the value of W may be independently configured for each channel/signal or may be configured in common to some channels/signals.

It is possible to suitably suppress influence of the transition time by allowing frequency hopping when the length of a channel/signal is equal to or larger than a certain value.

Figure 10:
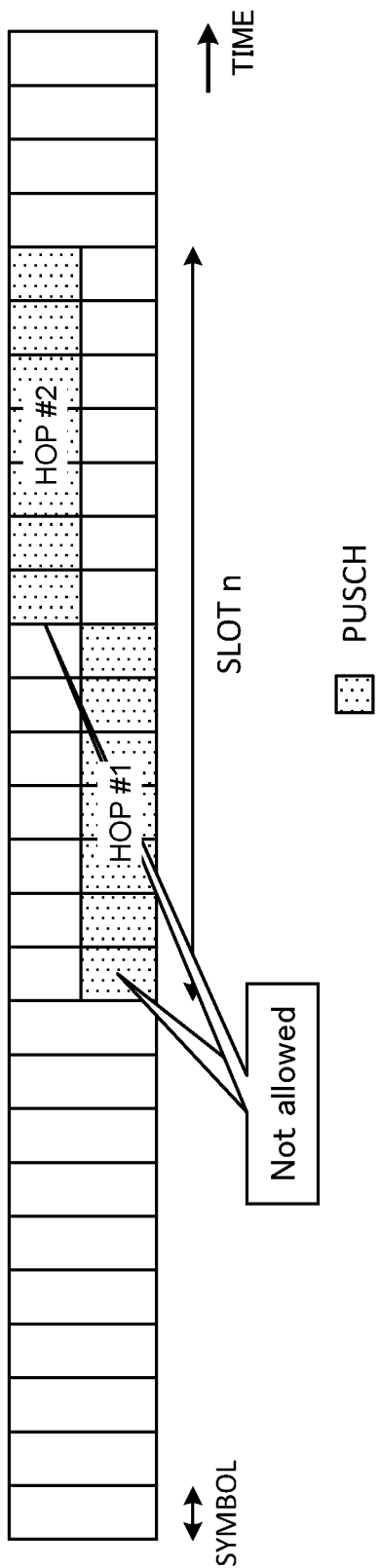
FIG. 10 is a diagram to show an example of a scheduling restriction according to the second embodiment.

FIG. 10 is a diagram to show an example of a scheduling restriction according to the second embodiment. In the present example, intra-slot frequency hopping is not supported for a PUSCH. In this case, the UE does not necessarily need to expect inter-slot frequency hopping of the PUSCH by using hops #1 and #2 as shown in FIG. 10.

[Restriction of BWP]

The UE may assume that a restriction is applied to a BWP configuration. For example, the UE may configure only one BWP for a cell (or CC).

When a plurality of BWPs are configured, the UE may perform switching from a BWP to another BWP with at least a gap described above in the first embodiment.

With such a configuration, it is possible to suitably suppress influence of BWP switching.

Figure 11:
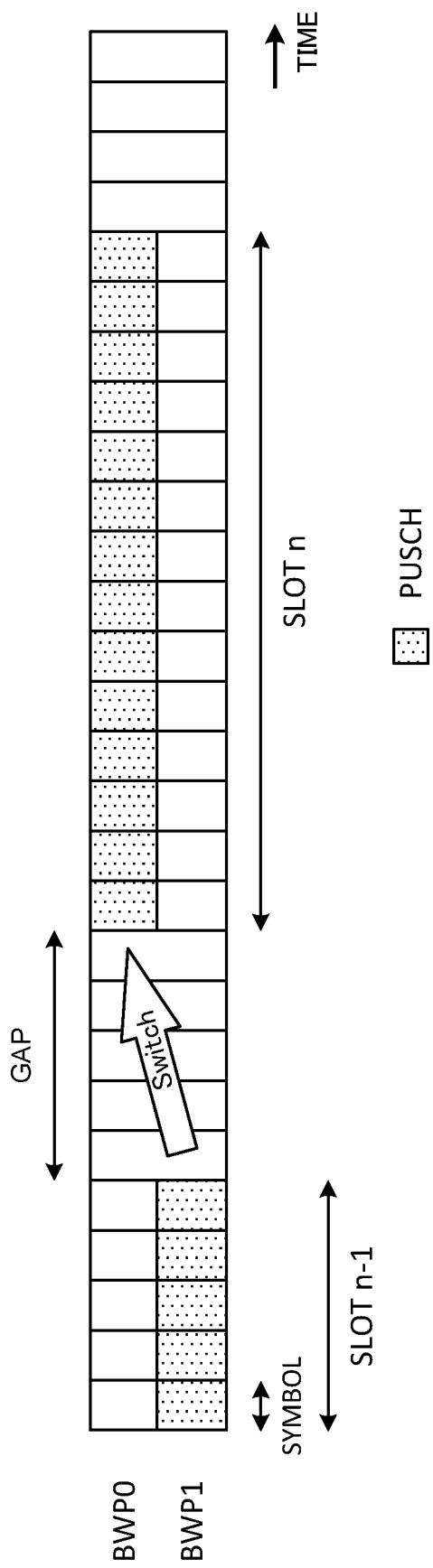
FIG. 11 is a diagram to show an example of a scheduling restriction according to the second embodiment.

FIG. 11 is a diagram to show an example of a scheduling restriction according to the second embodiment. In the present example, the UE has a gap for BWP switching between a PUSCH transmitted through BWP1 in slot n−1 and a PUSCH transmitted through BWP0 in slot n.

[Restriction of Beam]

The UE may assume that a restriction is applied to a beam configuration/indication. For example, the UE may use the same beam for transmissions of a plurality of temporally close channels/signals. The expression "temporally close" may have the above-described meaning, and duplicate description thereof is not repeated.

When a plurality of channels/signals are transmitted at gaps not larger than a certain number (for example, U) of symbols, the UE may use the same beam for transmissions of the plurality of channels/signals. With such a configuration, it is possible to reduce occurrence of beam switching.

The value of above-described U may be configured (may be interpreted as, for example, notified or indicated) to the UE by higher layer signaling, physical layer signaling, or a combination of these. Note that the value of U may be independently configured for each channel/signal or may be configured in common to some channels/signals. The value of U may be determined based on a combination of the above-described plurality of channels/signals.

Note that the UE may perform switching from a beam to another beam with at least a gap described above in the first embodiment.

In the present disclosure, a beam may be interchangeably interpreted with a TCI state.

Figure 12:
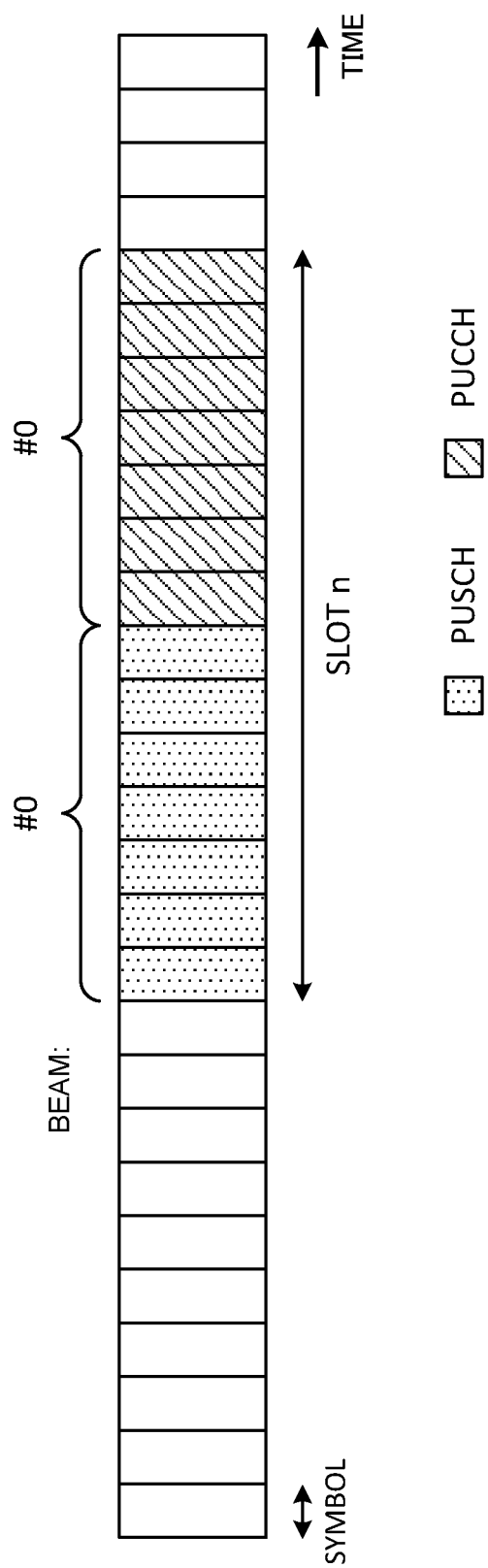
FIG. 12 is a diagram to show an example of a scheduling restriction according to the second embodiment.

FIG. 12 is a diagram to show an example of a scheduling restriction according to the second embodiment. In the present example, a PUSCH of seven symbols and a PUCCH of seven symbols are temporally continuously scheduled. In this case, the UE may transmit the PUSCH and the PUCCH with application of the same beam #0.

According to the second embodiment described above, it is possible to suitably suppress occurrence of the transient period that would cause adverse influence.

Third Embodiment

In a third embodiment, the UE applies repetitive mapping to a channel/signal. In this case, the transmission time of the channel/signal is extended, and thus influence of the transient period can be suitably suppressed. The repetitive mapping may be interchangeably interpreted with, for example, repetitive transmission or symbol copy.

For example, when symbol copy is applied, the UE may copy and map one symbol of a channel/signal to a plurality of continuous symbols.

Resource allocation in symbol copy may be performed without consideration of the copy. For example, when PUSCH transmission with a frequency resource of M PRBs and a time resource of T symbols is scheduled, the UE may perform PUSCH transmission with a frequency resource of M PRBs and a time resource of 2T symbols.

Whether to perform symbol copy may be configured (may be interpreted as, for example, notified or indicated) to the UE by higher layer signaling, physical layer signaling, or a combination of these. Note that symbol copy may be applied without particular configurations and the like.

Symbol copy may be sequentially applied in an order starting at the first symbol among originally scheduled symbols (in other words, the originally scheduled symbols and copied symbols may be alternately transmitted), or the copied symbols may be transmitted after the originally scheduled symbols are all transmitted. Which of these methods is to be used may be configured to the UE by higher layer signaling or the like.

The transmission of the copied symbols after the originally scheduled symbols are all transmitted may be called, for example, slot-based repetition or subslot-based repetition.

Note that information related to the number of symbols to which one symbol is copied, the number of times of repetition of one slot, and the like may be configured to the UE by higher layer signaling, physical layer signaling, or a combination of these.

When one slot is repeated through symbol copy, a plurality of slots as a result of the repetition may be defined as one slot. For example, when one slot including 14 symbols is repeated twice, all repeated symbols (28 symbols) may be expressed as one slot.

FIGS. 13A to 13C are diagrams to show an example of symbol copy according to the third embodiment. In the present example, the UE assumes that a PUSCH in FIG. 13A is scheduled. The UE is scheduled to map a demodulation reference signal (DMRS) for the PUSCH in FIG. 13A to symbols 3 and 11 among symbols 0 to 13 in slot n and map data symbols of the PUSCH to the other symbols.

FIG. 13B shows an example in which symbols of the PUSCH and the DMRS in FIG. 13A are copied and mapped to continuous symbols. Symbol i in FIG. 13A is mapped to symbols 2i and 2i+1 in FIG. 13B. The total number of transmitted symbols of the PUSCH and the DMRS is 28, but these symbols may be expressed as one slot.

FIG. 13C shows an example of slot-based repetition of symbols of the PUSCH and the DMRS in FIG. 13A. Symbol i in FIG. 13A is copied and mapped to symbol 14+i in FIG. 13C. The total number of transmitted symbols of the PUSCH and the DMRS is 28, but these symbols may be expressed as one slot.

According to the third embodiment described above, it is possible to suitably suppress occurrence of the transient period that would cause adverse influence.

Fourth Embodiment

In a fourth embodiment, a value is newly defined for at least one of the transient period, the BWP switching delay, and the beam switching delay. For example, a table listing such values may be newly defined.

For example, for the BWP switching delay, a new row may be introduced to the existing table in FIG. 4. FIG. 14 is a diagram to show an example of definition of the BWP switching delay that can support an SCS wider than 120 kHz. FIG. 14 is a table in which a row corresponding to an SCS wider than 120 kHz is defined in addition to the table in FIG. 4.

For example, $\mu=4$, 5, and 6 may correspond to the SCS=240, 480, and 960 kHz, respectively.

For Type 1, $T_{BWPswitchDelay}$ may be, for example, 12 slots ($\mu=4$), 24 slots ($\mu=5$), and 48 slots ($\mu=6$). For Type 2, $T_{BWPswitchDelay}$ may be, for example, 36 slots ($\mu=4$), 72 slots ($\mu=5$), and 144 slots ($\mu=6$).

Note that the values shown in FIG. 14 are exemplary, and the present disclosure is not limited to these values. For example, the same values between Types 1 and 2 may be used for $\mu=4$, 5, and 6.

As shown in FIG. 4, a request of the BWP switching delay non-linearly depends on the SCS. Note that, when BWP switching involves change of the SCS, delay of the BWP switching may be determined based on at least one (for example, the larger one) of the SCS before the BWP switching and the SCS after the BWP switching.

The BWP switching delay in Rel. 15 NR is not defined for an SCS wider than 120 kHz, which is used in FR4. The beam switching delay (in other words, a gap for beam switching) is not defined in Rel. 15 NR.

The values of a table defined for at least one of the transient period, the BWP switching delay, and the beam switching delay may be independently defined for each channel/signal or may be defined in common to some channels/signals.

A table defined for any one of the transient period, the BWP switching delay, and the beam switching delay may be applied to another one. For example, a table that is same as a table for the BWP switching delay may be interpreted and used as a table for the transient period or the beam switching delay.

According to the fourth embodiment described above, it is possible to perform transmission/reception processing by appropriately assuming the transient period or the like that does not cause adverse influence.

<Others>

Different contents in the above-described embodiments may be applied to downlink and uplink. This is because a request at a base station and a request at the UE are assumed to be different even in FR4.

FR4 may be divided into a plurality of parts (for example, sub-frequency ranges (sub-FRs)). For example, at least one of the above-described embodiments may be applied to sub-bands exceeding a certain frequency (for example, 52.6 GHz). Alternatively, at least one of the above-described embodiments may be applied to some of the sub-bands exceeding a certain frequency (for example, 52.6 GHz), and a configuration same as that of an existing system (for example, Rel. 15) may be applied to the other sub-bands.

In the present disclosure, a case of a high frequency domain (for example, FR4), a case in which a certain cell (for example, a primary cell (PCell) or a PUCCH secondary cell (PUCCH SCell)) is configured to FR4, a case of a particular SCS, and a case in which a particular SCS is configured to a certain cell may be interchangeably interpreted. The UE may apply at least one of the above-described embodiments to a channel/signal transmitted through any of such certain cells.

Note that a particular SCS may be an SCS larger than a certain value (for example, 120 kHz), an SCS when a parameter p corresponding to numerology is larger than a certain value (for example, three), or the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
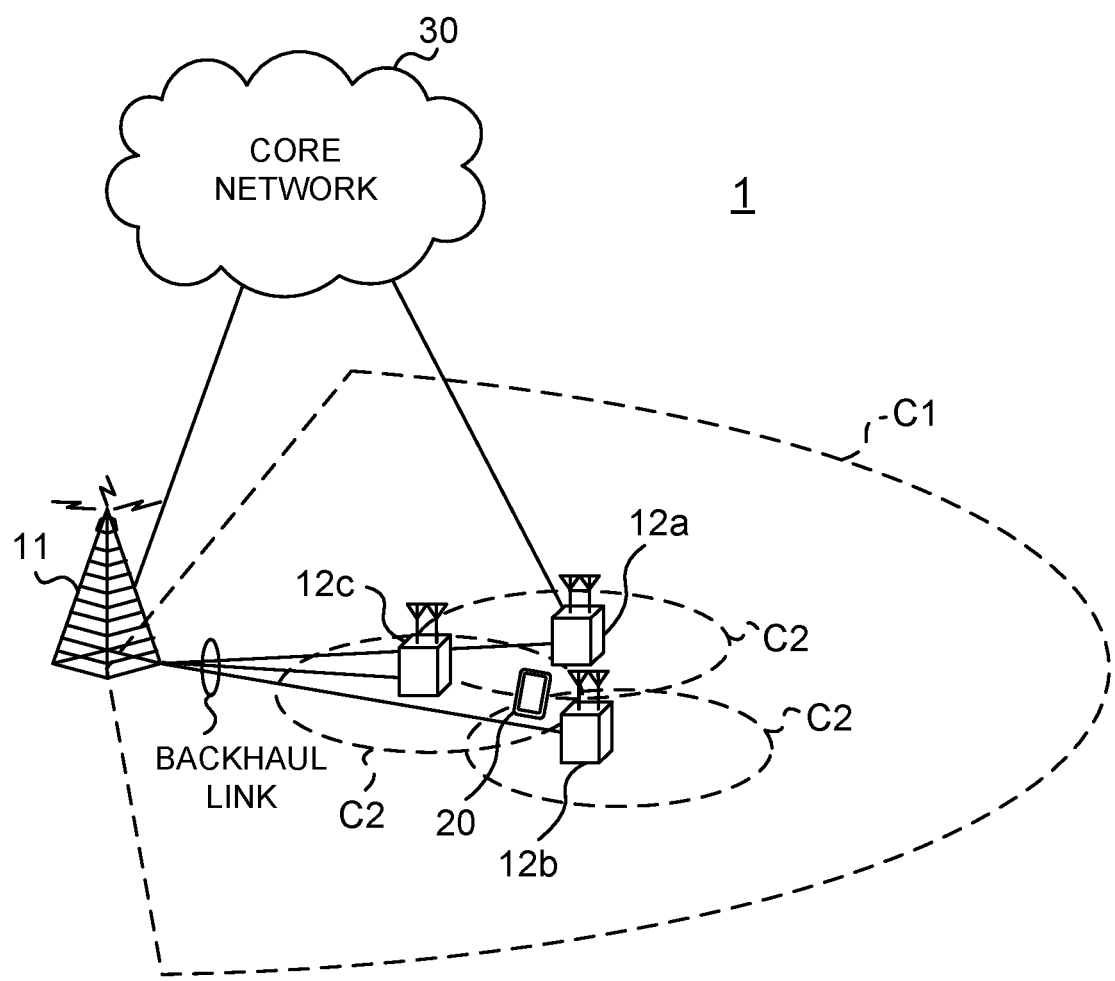
FIG. 15 is a diagram to show an example of a schematic structure of a radio communication system according to one embodiment.

FIG. 15 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 16:
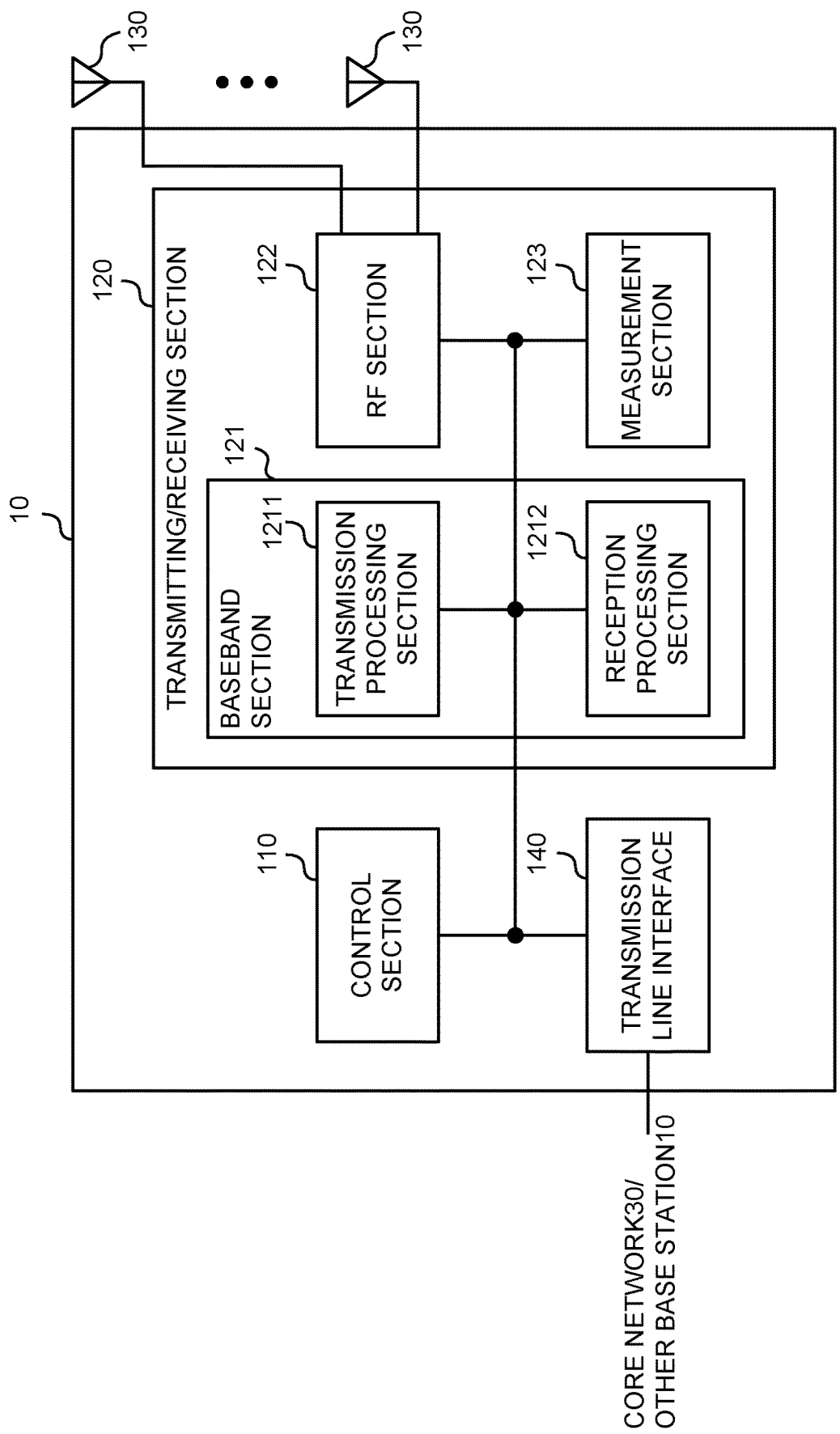
FIG. 16 is a diagram to show an example of a structure of a base station according to one embodiment.

FIG. 16 is a diagram to show an example of a structure of the base station according to one embodiment. The base station 10 includes a control section 110, a transmitting/receiving section 120, transmitting/receiving antennas 130 and a transmission line interface (communication path interface) 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the control section 110 may assume that a certain restriction is applied to communication supporting a subcarrier spacing (for example, 240 kHz) wider than a certain subcarrier spacing (for example, 120 kHz). The communication supporting a wide subcarrier spacing may be, for example, PUSCH transmission, PUCCH transmission, PDSCH transmission (reception), or PDCCH transmission (reception) that use the wide subcarrier spacing.

The transmitting/receiving section 120 may perform transmission/reception processing of the communication based on the certain restriction (for example, control whether to perform transmission/reception, or perform processing by assuming that transmission/reception is allowed).

The above-described certain restriction may be, for example, the scheduling restriction (may include the electric power restriction) described above in the second embodiment.

(User Terminal)

Figure 17:
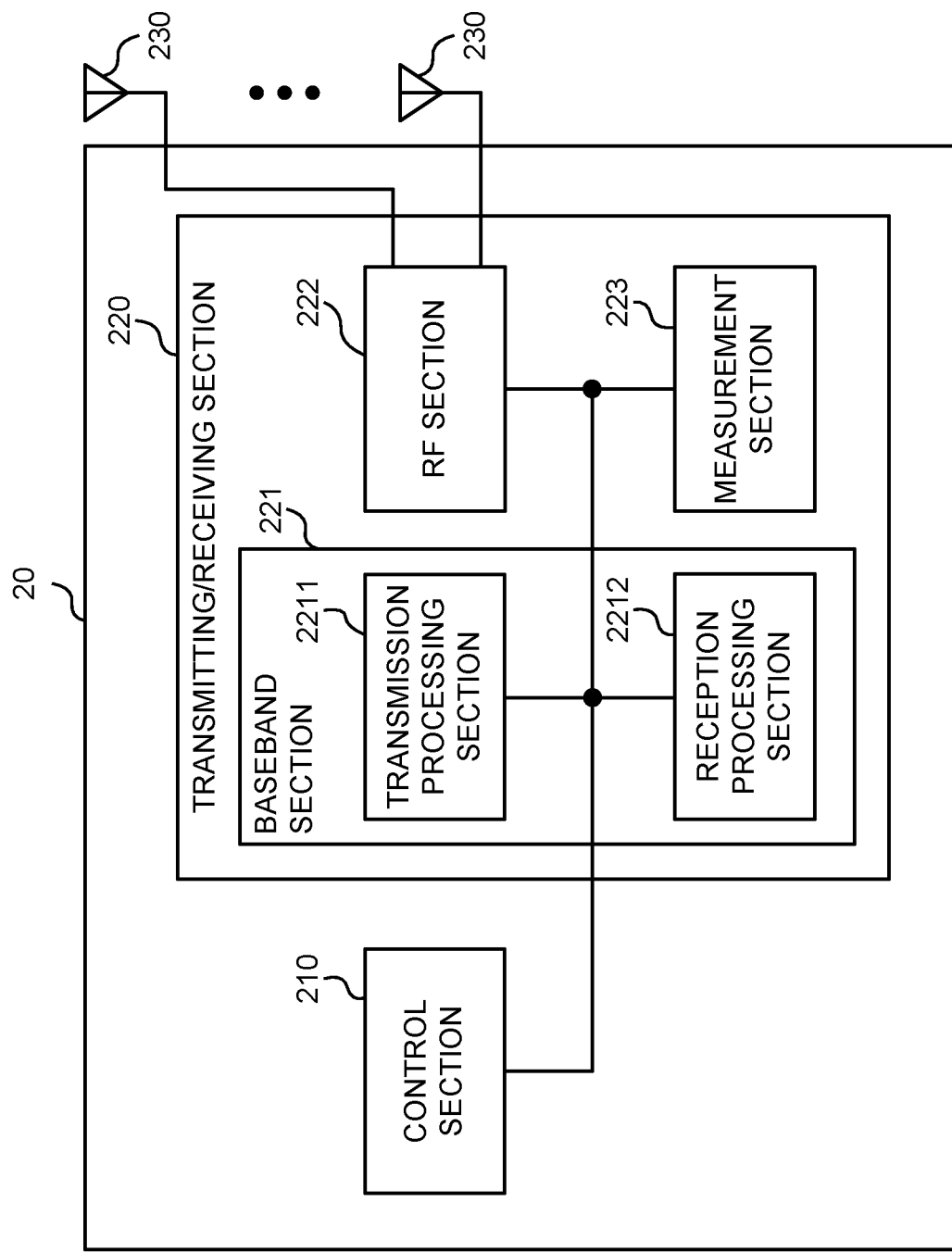
FIG. 17 is a diagram to show an example of a structure of a user terminal according to one embodiment.

FIG. 17 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may assume that a certain restriction is applied to communication supporting a subcarrier spacing (for example, 240 kHz) wider than a certain subcarrier spacing (for example, 120 kHz). The communication supporting a wide subcarrier spacing may be, for example, PUSCH transmission, PUCCH transmission, sounding reference signal (SRS) transmission, PDSCH transmission (reception), or PDCCH transmission (reception) that use the wide subcarrier spacing.

The transmitting/receiving section 220 may perform transmission/reception processing of the communication based on the certain restriction (for example, control whether to perform transmission/reception, or perform processing by assuming that transmission/reception is allowed).

The above-described certain restriction may be, for example, the scheduling restriction (may include the electric power restriction) described above in the second embodiment.

The control section 210 may assume that the communication has a time resource with a certain number of (Y) symbols or more.

The control section 210 may assume that the same transmission power is applied to a plurality of the communications that are temporally close to each other.

The control section 210 may assume that, when the communications of more than one carriers are temporally aligned, the communications of more than one carriers are allowed to be simultaneously performed.

The control section 210 may assume that a plurality of the communications that are temporally close to each other are allocated at gaps not larger than a certain number of physical resource blocks (V PRBs).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 18:
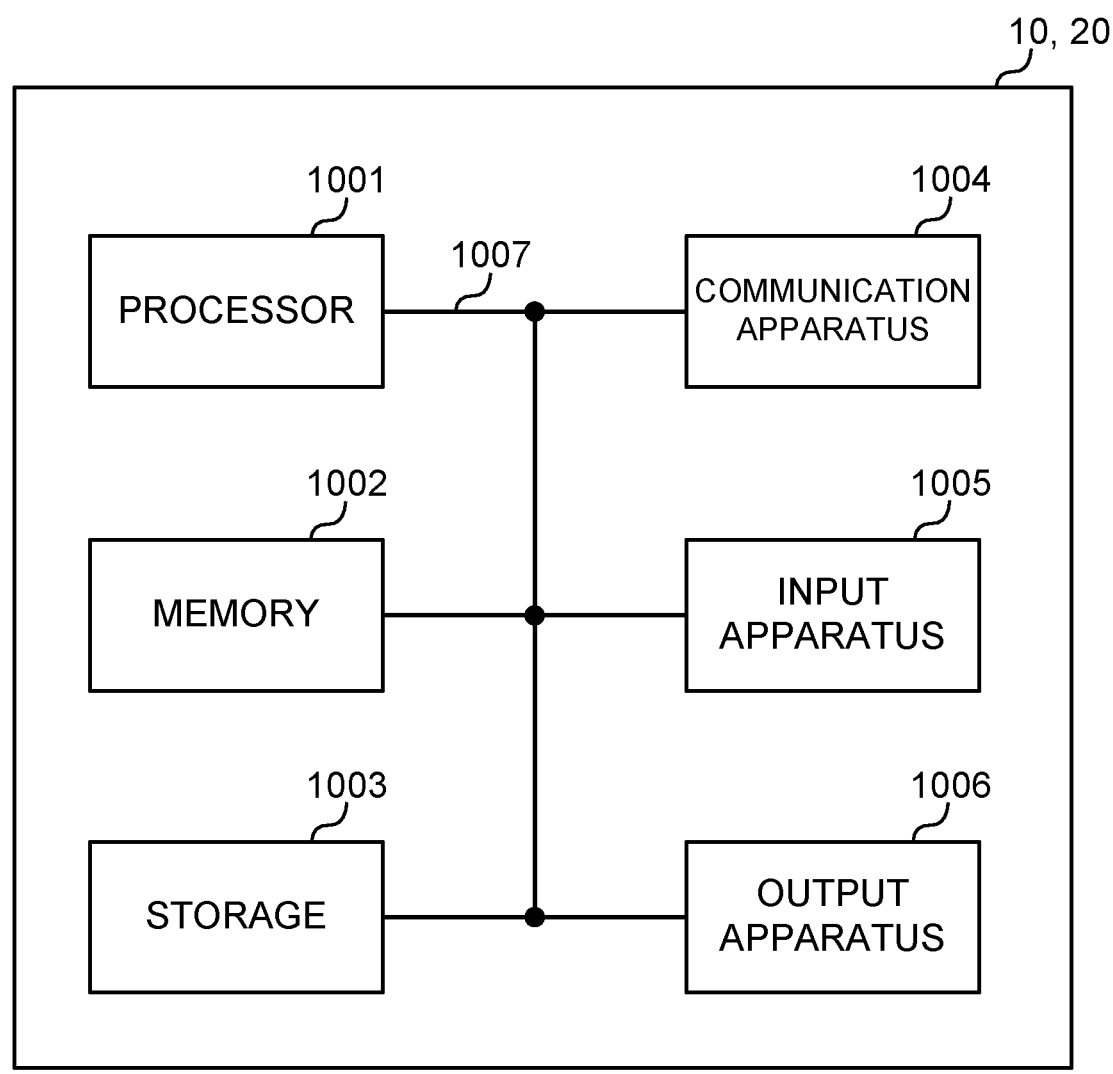
FIG. 18 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 18 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a processor that determines that there is a gap of a certain length between two signals corresponding to a subcarrier spacing of 480 kHz or 960 kHz in a frequency band higher than 52.6 GHz; and
   a receiver that performs reception processing of the two signals based on the gap,
   wherein the receiver performs reception processing of a signal after a bandwidth part (BWP) switching, based on a BWP switching delay time and in response to a request of the BWP switching, corresponding to the subcarrier spacing of 480 kHz or 960 kHz in the frequency band higher than 52.6 GHz.

2. The terminal according to claim 1, wherein the two signals are synchronization signal blocks.

3. The terminal according to claim 1, wherein the receiver performs reception processing of a signal after beam switching, based on a beam switching delay time corresponding to a subcarrier spacing of 480 kHz in a frequency band higher than 52.6 GHz.

4. A radio communication method for a terminal comprising:
   determining that there is a gap of a certain length between two signals corresponding to a subcarrier spacing of 480 kHz or 960 kHz in a frequency band higher than 52.6 GHz;
   performing reception processing of the two signals based on the gap; and
   performing reception processing of a signal after a bandwidth part (BWP) switching, based on a BWP switching delay time and in response to a request of the BWP switching, corresponding to the subcarrier spacing of 480 kHz or 960 kHz in the frequency band higher than 52.6 GHZ.

5. A base station comprising:
   a processor that determines that there is a gap of a certain length between two signals corresponding to a subcarrier spacing of 480 kHz or 960 kHz in a frequency band higher than 52.6 GHZ;
   a transmitter that performs transmission processing of the two signals based on the gap,
   wherein the transmitter performs transmission processing of a signal after a bandwidth part (BWP) switching, based on a BWP switching delay time and in response to a request of the BWP switching, corresponding to the subcarrier spacing of 480 kHz or 960 kHz in the frequency band higher than 52.6 GHz.

6. A system comprising a terminal and a base station, wherein:
   the terminal comprises:
     a processor that determines that there is a gap of a certain length between two signals corresponding to a subcarrier spacing of 480 kHz or 960 kHz in a frequency band higher than 52.6 GHz; and
     a receiver that performs reception processing of the two signals based on the gap, wherein the receiver performs reception processing of a signal after a bandwidth part BWP) switching, based on a BWP switching delay time and in response to a request of the BWP switching, corresponding to the subcarrier spacing of 480 kHz or 960 kHz in the frequency band higher than 52.6 GHZ, and the base station comprises:
a transmitter that performs transmission processing of the two signals based on the gap.

* * * * *